US005561787A

United States Patent [19]

Amorim et al.

[11] Patent Number: 5,561,787

[45] Date of Patent: Oct. 1, 1996

[54] USER INTERFACE MODULE

[75] Inventors: Rui Amorim, Penfield; Robert V. Brunner, Webster; Eugene S. Evanitsky, Pittsford; Joseph L. Filion, Rochester; Gregory C. Sosinski, Penfield, all of N.Y.

[73] Assignee: Xerox Corporation, Stamford, Conn.

[21] Appl. No.: 320,193

[22] Filed: Mar. 7, 1989

[51] Int. Cl.[6] .................................................. G06F 11/00

[52] U.S. Cl. .......................... 395/500; 364/267; 364/264; 364/267.6; 364/DIG. 1

[58] Field of Search ............................. 364/200 MS File, 364/900 MS File; 371/23, 22.5, 22.6; 395/500, 800

[56] References Cited

U.S. PATENT DOCUMENTS

| | | | |
|---|---|---|---|
| Re. 32,253 | 9/1986 | Bartulis | 364/900 |
| 3,932,843 | 1/1976 | Trelut | 395/500 |
| 4,133,477 | 1/1979 | Marino | 355/209 |
| 4,162,396 | 7/1979 | Howard | 355/209 |
| 4,385,349 | 5/1983 | Ashford et al. | 364/184 |
| 4,457,617 | 7/1984 | Tolmie | 355/208 |
| 4,512,747 | 4/1985 | Hitchens | 364/151 |
| 4,538,267 | 8/1985 | Uchida | 355/209 |
| 4,559,519 | 12/1985 | Matsumoto | 355/209 |
| 4,589,080 | 5/1986 | Abbott | 364/552 |
| 4,604,718 | 8/1986 | Norman | 364/150 |
| 4,644,487 | 2/1987 | Smith | 364/578 |
| 4,682,280 | 7/1987 | Schneider | 364/191 |
| 4,817,093 | 3/1989 | Jacobs | 371/25 |
| 4,873,549 | 10/1989 | Tada | 355/209 |
| 4,878,179 | 10/1989 | Larsen | 364/490 |
| 4,914,476 | 4/1990 | Nishitsuji | 355/209 |
| 4,918,594 | 4/1990 | Onizuka | 395/500 |

OTHER PUBLICATIONS

IBM Technical Disclosure Bulletin; vol. 18, No. 1, Jun. 1975; Author: H. H. Hegener et al.; Title: "Test For Data Processing System".

IBM Technical Disclosure Bulletin; vol. 30, No. 4, Sep. 1987; Author: Unknown; Title: "Testing Multiple Discrete . . . Hardware Components".

*Primary Examiner*—Eric Coleman

*Attorney, Agent, or Firm*—Ronald F. Chapuran

[57] ABSTRACT

A system simulator including a plurality of nodes or processor boards for controlling the operation of the interactive sub-systems. The simulator includes a user interface having a screen providing a display of node selections for preselecting a given subset of the plurality of nodes, a memory for retaining the node selections for use in operating the machine, a control for simulating operation of the given subset of plurality of nodes, and for operating the remaining nodes to control at least a portion of the interactive sub-systems. The simulator can be integral with the reproduction machine or a stand alone device.

15 Claims, 7 Drawing Sheets

USER INTERFACE MODULE

BACKGROUND OF THE INVENTION

The invention relates to a User Interface Module for programming reproduction machines such as copiers and printers, and more particularly, to a User Interface that can selectively simulate the operation of such reproduction machines, that is, partially configure the machine, and that can stand alone to program and simulate the operation of such machines.

As reproduction machines such as copiers and printers become more complex and versatile in the jobs they can do, the user interface between the machine and the operator or user, which in essence permits the dialogue between operator and machine, must necessarily be expanded if full and efficient utilization of the machine is to be realized. A suitable interface must not only provide the controls, displays, and messages necessary to activate and program the machine, but also to monitor and maintain the machine, and do so in an efficient, relatively simple, and straightforward way.

The prior art is replete with user interface systems. For example, the Xerox 5700 Electronic Printing System incorporates a touch control CRT screen providing button, key, and window images on the screen combined with text to give concise instructions to the operator. This system accepts magnetic cards, cassettes, and disks that store the documents to be printed and also the magnetic media can store control information to specify the output format for printing or to invoke special features such as merging or interleaving. The system software translates the coded data, formats the page, and generates the hard copy locally, or the system can transmit the data via a communication link to remote 5700 printing sites.

IBM Technical Disclosure Bulletin, Vol. 18, No. 1, discloses a diagnostic system which provides a hardware emulator in place of a system device for subsystem testing during manufacturing. The hardware emulator is a controller which receives and sense signals from and to a processor according to loaded microcode.

U.S. Pat. No. 4,385,349 to Ashford et al. discloses a simulated machine tool controller for diagnostic purposes. The simulated controller is incorporated in a system central processor. Means for sending commands to the simulated controller and receiving responses from it are included in the central processor.

IBM Technical Disclosure Bulletin, Vol. 30, No. 4, discloses a method of simulating hardware components not yet available in a processor system that may be of interest as a general teaching directed to system simulation.

A difficulty with the prior art reproduction machine systems is often the inability to test and simulate various operations and machine functions. For example, a reproduction center might want to simulate the results of various changes in the auditron billing rates. A customer might want to pre-program the machine and simulate a reproduction run before actually committing the machine to operation. It might also be desirable to have a stand alone interface, identical to the machine interface that can be used to pre-program the machine for a reproduction run without interfering with the actual machine interface. A stand alone interface device could also be used to selectively simulate operation of portions of the machine.

It would also be desirable, for example, to be able to selectively simulate machine operation for trouble shooting during software development and during development of mechanical components, and to be able to selectively simulate machine operation during manufacture. It is an object, therefore, of the present invention to provide a new and improved device that is integral with a reproduction machine or stands alone for simulating the operation of the entire machine or simulating operation of only portions of the machine while the remainder of the machine operates normally. Further advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with a system simulator for totally or partially simulating the operation of a reproduction machine having a plurality of interactive sub-systems and a control including a plurality of nodes or processor boards for controlling the operation of the interactive sub-systems. The simulator includes a user interface having a screen providing a display of node selections for pre-selecting a given subset of the plurality of nodes, a memory for retaining the node selections for use in operating the machine, a control for simulating operation of the given subset of plurality of nodes and for operating the remaining nodes to control at least a portion of the interactive sub-systems. The simulator can be integral with the reproduction machine or a stand alone device.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
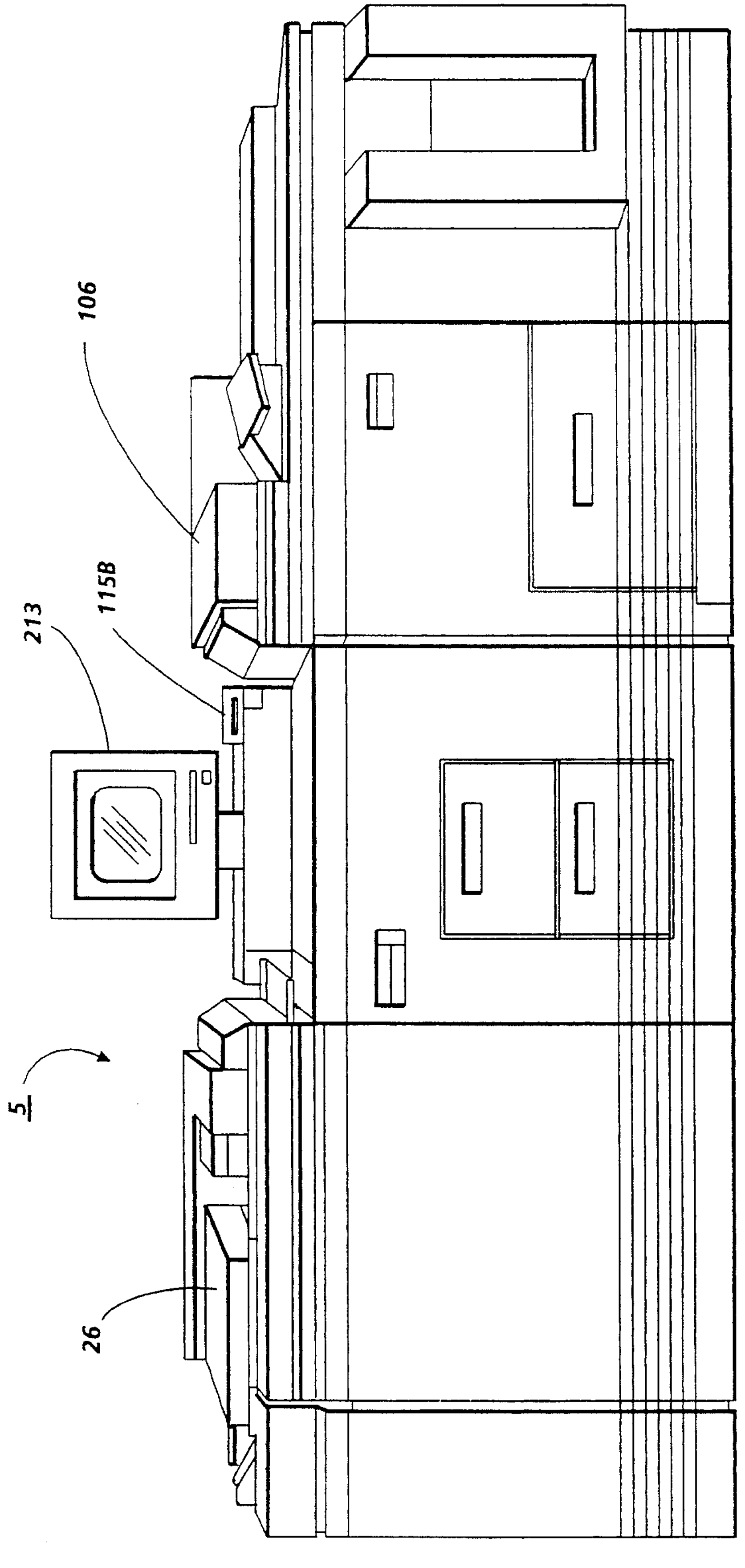
FIG. 1 is an isometric view of an illustrative reproduction machine incorporating the system simulator of the present invention.
Figure 2:
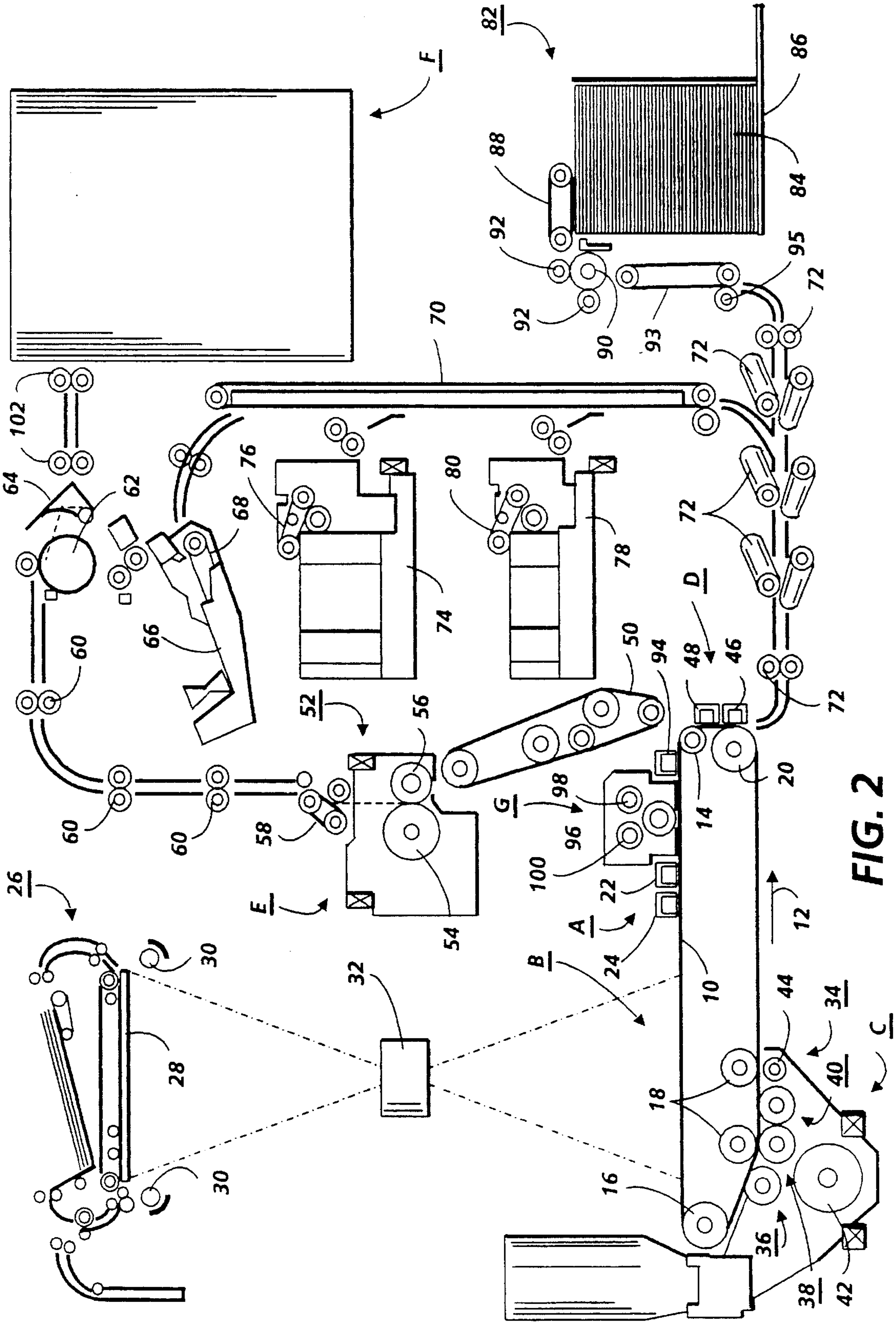
FIG. 2 is a schematic elevational view depicting various operating components and sub-systems of the machine shown in FIG. 1.

Referring to FIGS. 1 and 2, there is shown an electrophotographic reproduction machine 5 composed of a plurality of programmable components and sub-systems which cooperate to carry out the copying or printing job programmed through the touch dialogue User Interface (U.I.).

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller which preferably comprises one or more programmable microprocessors. The controller provides a comparison count of the copy sheets, the number of documents being recirculated, the number of copy sheets selected by the operator, time delays, and jam corrections. Programming and operating control over machine 5 is accomplished through the User Interface. Operating and control information is stored in a suitable memory and loaded into controller and job programming instructions are loaded into the controller through the User Interface. Conventional sheet path sensors or switches may be utilized to keep track of the position of the documents and the copy sheets. In addition, the controller regulates the various positions of the gates depending upon the mode of operation selected.

Figure 3:
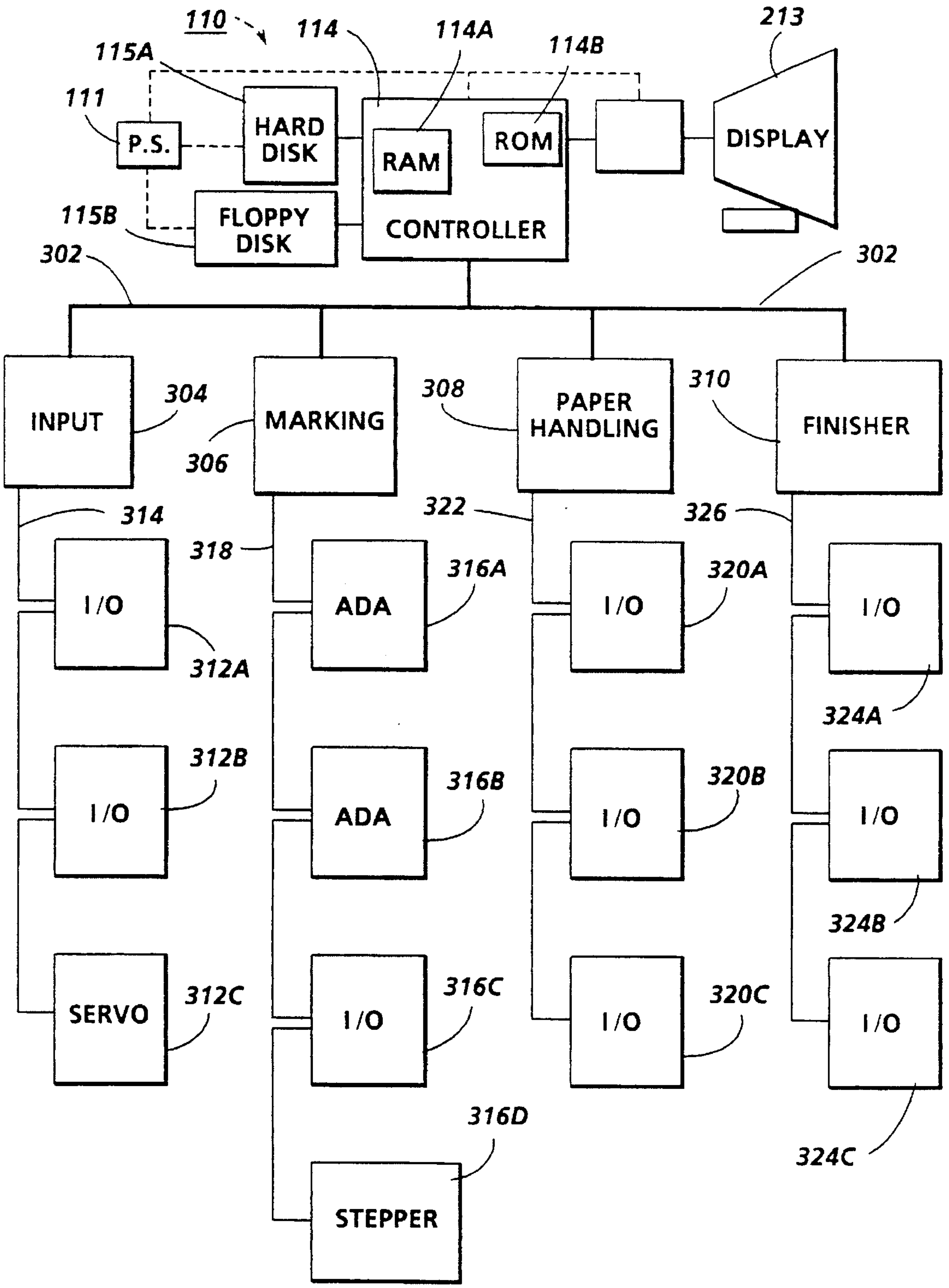
FIG. 3 is a block diagram of the operating control systems and memory for the machine shown in FIG. 1.

With reference to FIG. 3, the User Interface (U.I.) shown generally at 110 includes memory 115 having a hard or rigid disk drive 115A for receiving suitable rigid memory disks and a floppy disk drive 115B for receiving suitable floppy memory disks, both disk drives being electrically connected to Controller 114, the Controller 114 including RAM 114A and ROM 114B. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. In normal machine operation, all of the control code and screen display information for the machine is loaded from the rigid disk at machine power up. Changing the data that gets loaded into the machine for execution can be done by exchanging the rigid disk in the machine 5 for another rigid disk with a different version of data. In accordance with the present invention, however, all of the control code and screen display information for the machine can be loaded from a floppy disk at machine power up using the floppy disk drive built into the machine 5. Suitable display 213 of U.I. 110 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/ analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326.

Figure 4:
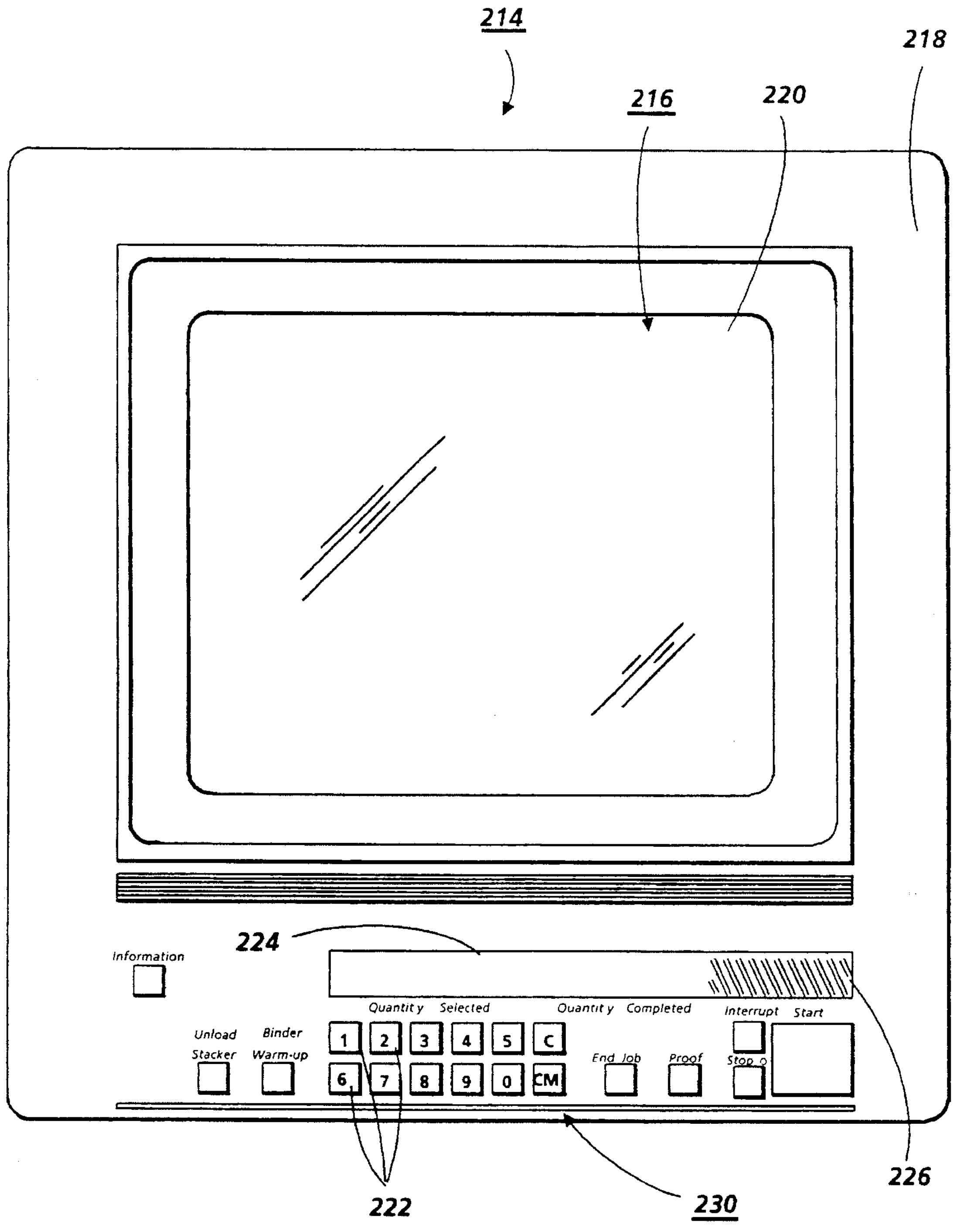
FIG. 4 is a front view of the user interface monitor that is part of the system simulator.

Referring to FIG. 4, there is shown the color touch monitor 214 for the touch dialogue U.I. 110. Monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0–9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "Interrupt" button to initiate a job interrupt; a "Proof" button to initiate making of a proof copy; an "End Job" button to end the current job; and an "i" button to initiate a request for information. For further details of the control, reference may be had to U.S. Ser. No. 07/164,365, now U.S. Pat. No. 5,079,723, filed Mar. 4, 1988 and incorporated herein.

As illustrated in FIG. 3, the control for the machine includes the User Interface 110 including controller 114, hard disk drive 115A, floppy disk drive 115B and display 13. The remainder of the control includes the input board 304 with related input/output controls, the marking board 306 with related input/output and ADA boards, paper handling board 308 with related input/output controls and a finisher 310 with related input/output control. Each of these boards can be considered an element or node in the overall control architecture, the controller 114 being system administrator node, and each of the four remaining boards 304, 306, 308 and 310 being base nodes 1, 2, 3 and 4.

Figure 5:
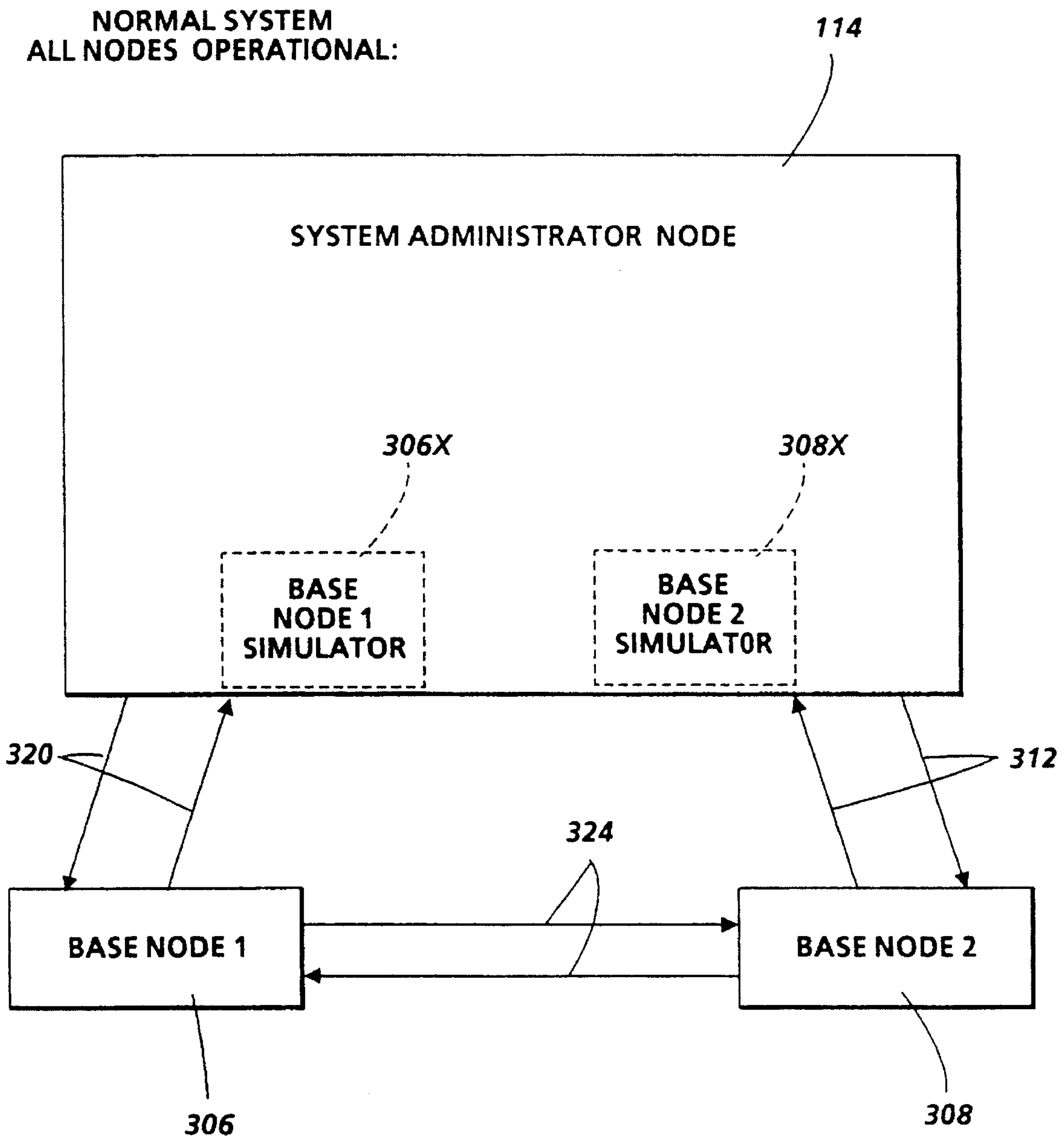
FIGS. 5, 6, 7 illustrate the operation of the system simulator in accordance with the present invention.

In accordance with the present invention, reference is made to FIG. 5, illustrating the controller 114 or system administrator node interonnected to a base node 1, for example, the marking board 306 and base node 2, for example, the paper handling board 308. Similar to the two-way communication between the controller 114 and the marking and paper handling boards 306 and 308 in FIG. 3 along the two-way communication bus 302, the base node 1, base note 2, and system administrator node communication in FIG. 5 is illustrated as a two-way communication illustrated by the arrows 312, 320, 324. Also illustrated in FIG. 5 in phantom are a base node 1 simulator 306X and a base node 2 simulator 308X.

In normal machine operation, there is two-way communication between the system administrator node or controller 114 and the base node 1 (306) and base node 2 (308) and in turn, base node 1 (306) communicates with its associated input output devices such as ADA 316A, ADA 316B and input/output 316C and base node 2 (308) communicates with associated input/output devices such as input/output 320A, 320B and 302C. These input/output devices, in turn, communicate with various machine components such as motor and clutch drivers and input sensors and switches. The base node simulator 306X and base node simulator 308X each represent a code package stored in the system administrator node 114 to be able to simulate the communication of the base node 1 and base node 2 to related input and output devices when the input/output devices are not actually receiving input data or sending output signals. As shown in FIG. 5, the base node 1 simulator and base node 2 simulator are inactive during the normal operation of the machine components connected to base node 1 and base node 2.

Figure 6:
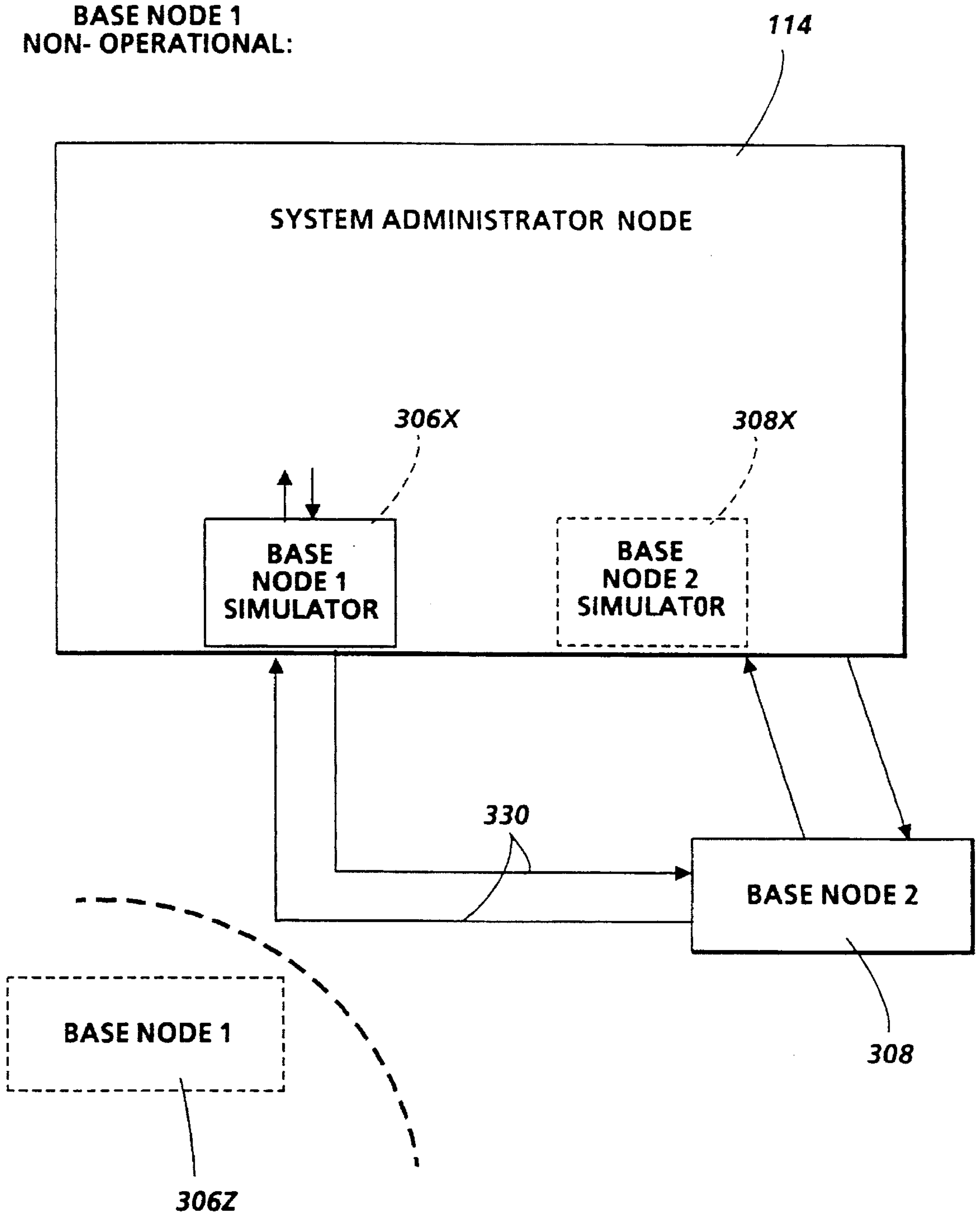

The operation of selected base nodes can be simulated while the operation of other base nodes are actually related to machine components. As illustrated in FIG. 6, the base node 2 simulator 308X is shown in phantom again and thus the base node 2 (308) is actually controlling the paper handling portion of the machine. However, the base node 1 306 (306) is no longer illustrated external to the system administrator node 114 and the base node 1 simulator 306X is no longer shown in phantom. Thus, the marking control board 306 is not interconnected with its associated machine components but rather in the operation of the machine, the various data and signals that would otherwise be exchanged between the marking control board 306 and the controller board 114 are now being simulated by the software package 306X resident on the controller board 114. All the signals from the base node 2 that were exchanged between the base node 2 and base node 1 in FIG. 5, are now exchanged between the base node 2 and the base node 1 simulator 306X as illustrated by the arrows 330.

In operation, the system administrator node 114 determines that the base node 1 is non-operational and provides suitable signals to the internal package, base node 1 simulator 306X. Similarly, the control in the base node 2 determines that base node 1 is non-operational and likewise sends signals to the base node 1 simulator code package 306X on the system administrator node. It should be apparent that this type of configuration and system architecture is useful in the reproduction environment to allow development and manufacturing test of sub-systems without the need of operation of the entire machine.

It should be noted that the base node 1 is no longer actively interconnected to its related input and output devices. It should also be noted, that whereas base node 1 has been illustrated as being simulated, base node 1 as well as base nodes 3 and 4 could all be simulated together, and that the use of only two base nodes is merely for illustrative purposes. Any one or combination of base nodes could be simulated in accordance with the scope of the present invention.

Figure 7:
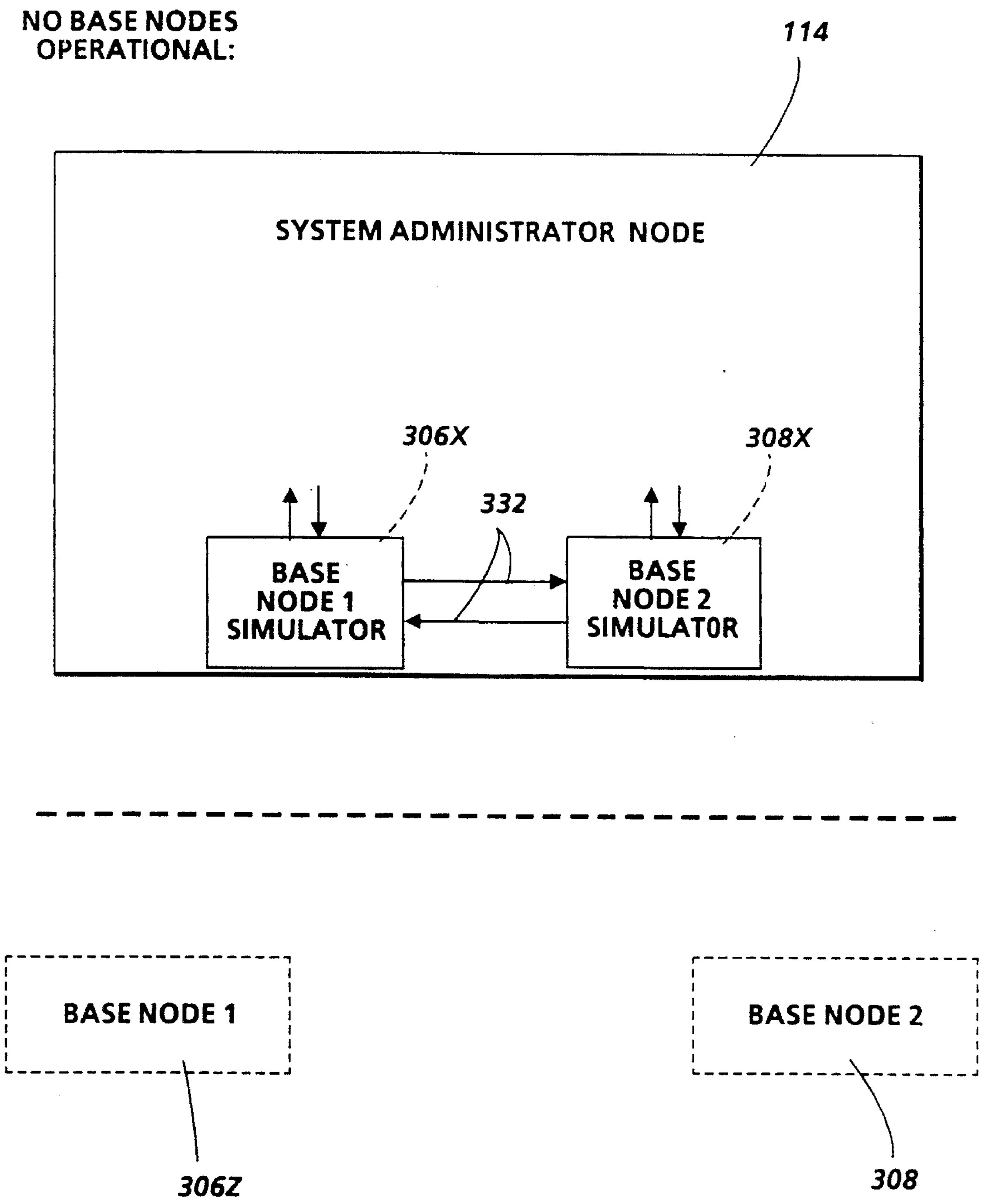

With reference to FIG. 7, base nodes 1 and 2 are shown to be non-operational that is base nodes 1 and 2 are being simulated. As described above, the system administrator node control determines that the base nodes 1 and 2 are not operational and provides the suitable signals to each of the base node simulator code packages 306X and 308X. Each of the simulator code packages determines that the other node is also non-operational and provides signals to that respective node's simulator code package as well shown by arrow 332. As illustrated, in this example of only two nodes which could represent all the nodes in the system, all the communications are internal to the system administrator such that the entire machine is being simulated with no actual control of machine components. It should be apparent, therefore, that all the nodes except the system administrator node can be simulated, and in effect, the entire machine simulated. Thus, the User Interface 110 provides a stand alone device to simulate the entire operation of the machine.

In accordance with present invention, as illustrated in FIG. 3, a power supply 111 is provided to power the hard disk drive 115A, the floppy disk drive 115B, controller 114 and a display 213 in order that the User Interface 110 can be used as a stand alone device to simulate the operation of the machine 5. Thus, for example, the User Interface 110 can be used to diagnose, and monitor the machine 5 without the necessity of providing a machine, or can selectively test portions of the machine. For example, the User Interface 110 can be used to test the mechanical operation of a recirculating document handler controlled by the input board 304. To do this, it is only necessary to simulate the operation of the marking board 306, the paper handling board 308 and the finishing board 310 and focus the testing on the actual mechanical operation of the recirculating document handler.

In operation, with the system suitably placed in a simulation mode, there is displayed on the screen icons corresponding to the input, marking, paper handling, and finisher boards. As is well known, as suitably referenced above, the icons representing the boards to be simulated can be suitably engaged on the display screen to provide appropriate signals to the system administrator node or controller 114. In response, the system administrator node enables the corresponding simulator code packages to provide the appropriate signals during the operation of the machine. In turn, each simulator code package determines which nodes are operational or non-operational in order to communicate or not communicate with the corresponding simulator code packages.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a reproduction machine having a plurality of interactive sub-systems cooperable with one another to produce copies from document originals, the combination of:

a user interface having a screen providing a display of programming selections for programming said machine;

memory means for retaining said program selections for use in operating said machine;

control means for operating said machine in response to the program stored in said memory means;

the user interface including means to select a given subset of said sub-system; and means to simulate the operation of said subset of sub-systems while concurrently operating the remaining sub-systems.

2. The combination of claim 1 wherein the subset includes at least one of the subsystems.

3. The combination of claim 1 wherein the subset includes at all of the subsystems.

4. The combination of claim 1 wherein the user interface includes simulator code packages representing the interactive subsystems and an integral power supply for simulating the operation of said reproduction machine while said machine is inoperative.

5. In a reproduction machine having a plurality of interactive sub-systems cooperable with one another to produce copies from document originals and a control including a plurality of nodes for controlling the operation of the interactive sub-systems, each node controlling a portion of the interactive sub-systems, the combination of:

a user interface having a screen providing a display of node selections for pre-selecting a subset of said plurality of nodes;

memory means for retaining said node selections for use in operating said machine;

control means for operating said machine in response to the node selections stored in said memory means, the control means including means to simulate operation of the portion of the interactive sub-systems, controlled by the pre-selected subset of said plurality of nodes, and means to concurrently operate the remaining interactive sub-systems controlled by the non-selected nodes.

6. The combination of claim 5 wherein each of the nodes is a control board having a processor and Input/Output control.

7. The combination of claim 5 wherein the subset includes at least one of said nodes.

8. The combination of claim 5 wherein the subset includes all of the nodes.

9. The combination of claim 5 wherein one of the nodes includes simulator code packages representing the interactive subsystems and wherein the user interface includes an integral power supply, the user interface for simulating the operation of said reproduction machine while said machine is inoperative.

10. In a reproduction machine having a plurality of interactive sub-systems cooperable with one another to produce copies from document originals and a control including a user interface with a display and a plurality of nodes for controlling the operation of the interactive sub-systems, each node controlling a portion of the interactive sub-systems, the method of simulating operation of the machine comprising the steps of:

displaying a representation each of said plurality on nodes of the screen of said display;

pre-selecting a subset of said plurality of nodes;

simulating the operation of the portion of the interactive sub-systems controlled by the pre-selected subset of said plurality of nodes; and concurrently operating the remaining interactive sub-systems controlled by the non-selected nodes whereby the portion of the interactive sub-systems corresponding to the non-selected nodes can be monitored.

11. The method of claim 10 wherein the step of preselecting includes the step selecting all but one of the nodes to simulate the entire operation of the machine except one sub-system.

12. The method of claim 11 wherein the one subsystem is a recirculating document handler.

13. The method of claim 11 wherein the one subsystem is a finisher station.

14. The method of claim 11 wherein the one subsystem is the reproduction machine xerographic process.

15. The method of claim 10 wherein the step of preselecting includes the step selecting all of the nodes to simulate the entire operation of the machine.

* * * * *